April 19, 1927.
F. W. GAY
1,625,464
ELECTRICAL CURRENT LIMITING SYSTEM
Filed April 22, 1926
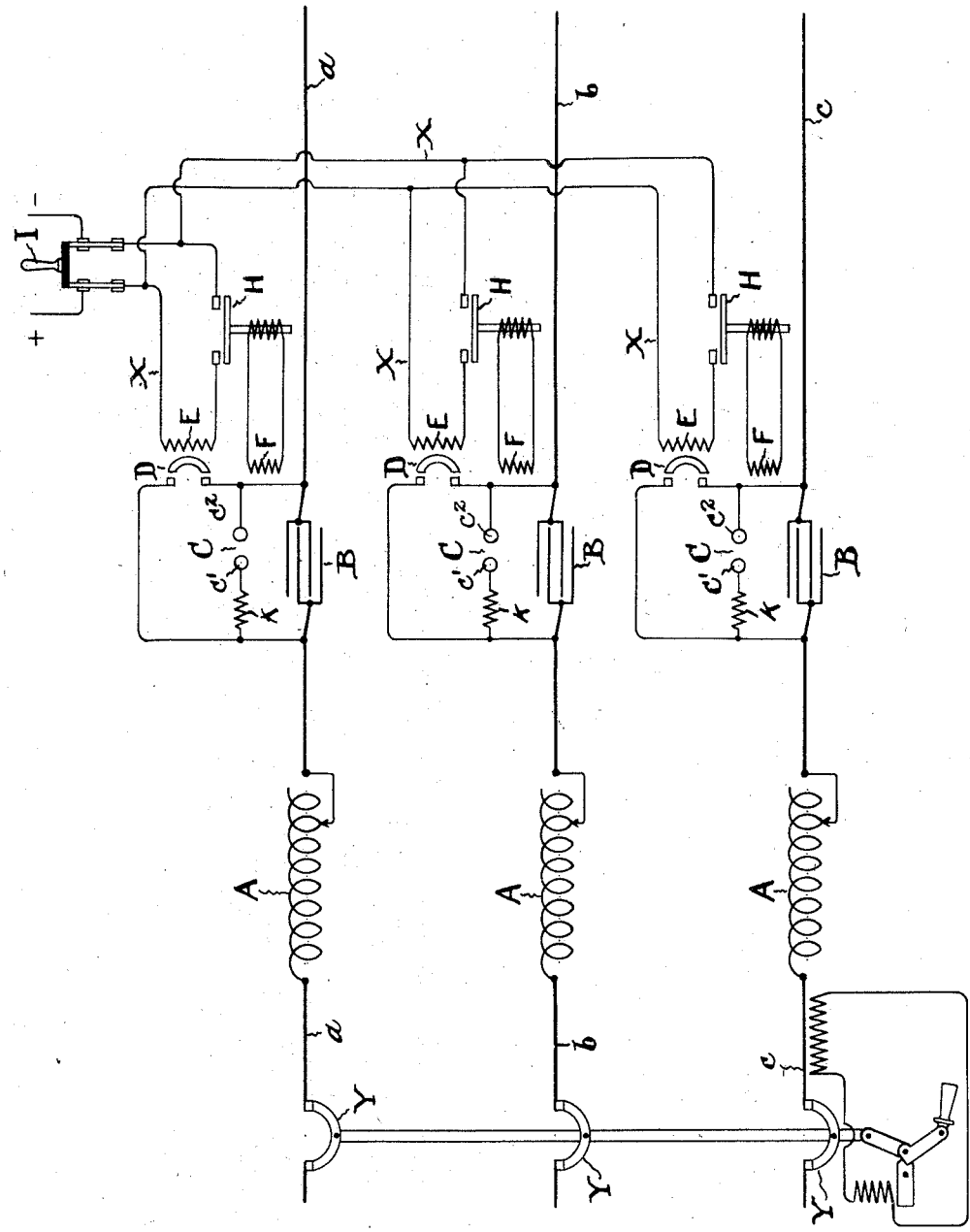
INVENTOR.
Frazer W. Gay,
BY
Krautzel and Richards
ATTORNEYS.

Patented Apr. 19, 1927.

1,625,464

UNITED STATES PATENT OFFICE.

FRAZER W. GAY, OF NEWARK, NEW JERSEY.

ELECTRICAL-CURRENT-LIMITING SYSTEM.

Application filed April 22, 1926. Serial No. 103,890.

This invention relates to an improved arrangement and construction of electrical power delivery circuits provided with means for limiting rises of current in the event of the occurrences of short circuits in the line.

In current limiting systems heretofore made use of in power delivery lines, it has been found that the arrangement and construction of the same gives rise to certain disadvantages and objections. For example, in systems wherein a resistance or a reactance or a capacitance has been permanently introduced in the circuit to limit the rise of current due to the occurrence of short circuits, it has been found that the same interfere with the normal operation of the circuit by producing a voltage drop or loss which increases in a proportional relation to the value or efficiency of such introduced current limiting element; i. e., the voltage drop or loss becomes greater as the protection of the current limiting element against short circuit pressures becomes more complete. Consequently, with such method and means of protection or current limiting, if it is desired to prevent more than two hundred per cent of normal full load flowing in a circuit, so great a resistance, reactance or capacitance, as the case may be, has to be employed as to greatly reduce the efficiency of the circuit for the normal carrying of K. V. A. Further more, if a resistance, or reactance or capacitance is automatically inserted in the circuit after the occurrence of a short circuit, or the circuit is automatically opened under such circumstances, the electro-mechanical mediums for so inserting the current limiting element or for opening the circuit are usually of such relatively slow acting character, that a very high current may be permitted to pass before effective arresting thereof takes place, and consequently such high current may do considerable damage to the external circuit, or may disturb the normal processes in the generating station, or may render the insertion of a current limiting element very difficult if not impossible by reason of the great difficulties involved in attempting to switch so great a circuit.

It is the primary object of my present invention to provide a novel arrangement and construction of current limiting means adapted to avoid, among others, the disadvantages and objections above pointed out, while at the same time providing a substantially instantaneously operating means adapted to initially curb a current rise and limit the same until the main protective circuit breakers in the power delivery line are brought into operation, the arrangement and character of the novel current limiting means being such that comparatively little loss or drop in the line voltage occurs under normal conditions of current flow.

The invention has for a further object to provide a very inexpensive but highly efficient current limiting means, comprising electrical devices of relatively simple character combined in a novel relation for the purposes in view.

With these objects in view, my invention comprises a suitable reactance and a suitable capacitance permanently inserted in the circuit to be protected in series relation. The reactance and capacitance are chosen each of such value and character that they compensate each other with respect to voltage drop, so that, with full or normal load current flowing in the circuit, the impedance of the reactance is approximately balanced by the capacity of the condenser in series therewith, and consequently the voltage drop across the two in series will only be the sum of the apparent resistance drop of each. Arranged in parallel or shunt across either the reactance or the capacitance is a high speed circuit make and break or short circuiting device with which is associated in parallel a spark gap, all in such manner that a rise in voltage across the reactance or capacitance, as the case may be, will cause the spark gap to break over and short circuit the same so that the remaining current limiting element in the circuit will function to limit abnormal current rise. The flow of current across the spark gap will energize a relay to cause the closing of said high speed circuit make and break or short circuiting device, thereby shunting the current around the spark gap so as to quickly quench the same. The current limiting element which alone remains in circuit functions to curb or limit the current rise, until the main protective circuit breakers in the power line are brought into operation, either manually or automatically but preferably the latter.

In order to illustrate the fundamentals of my invention, I have shown in the accompanying drawing a diagram of one embodiment thereof, although it will be understood that I do not limit myself specifically to this illustrated form.

The said diagram illustrates a form of my novel current limiting arrangement and means adapted to serve in connection with a three phase A. C. power delivery circuit, which, for example, will be considered a 1000 ampere 13200 volt circuit. Coupled in series in each phase $a$, $b$ and $c$ of the power delivery circuit is a suitable reactance A and a condenser B; and both said reactance and condenser are of character or value to respectively provide a drop of 3800 volts at 1000 amperes. A spark gap C is connected in shunt or parallel across the condenser B, the same having its terminal spheres $c'$ and $c^2$ adjustably spaced apart to pass or arc over the current on a R. M. S. voltage of 7600 volts; consequently when the current rises to approximately twice normal it will break or arc over the spark gap C and will thus short circuit the condenser B so that the full impedance value of the reactance A is brought into effect to curb or limit the current rise. Also connected in parallel or shunt circuit with the spark gap C and condenser B is a high speed or rapidly acting circuit make and break D which is normally in shunt circuit opening condition. The circuit make and break devices D of the several phases $a$, $b$, and $c$ are connected in parallel in an auxiliary control circuit X which is manually opened or closed by the two-pole lever-switch I, or other suitable main switch. The several parallel branches of said control circuit X are provided with relays H, the operation of which is in turn controlled by transformers F in each spark-gap circuit, so that when current breaks or arcs across the spark-gap C, the associated transformer F will be energized to in turn actuate the corresponding relay H, thus closing the control circuit X to thereby energize the closing coil E of the corresponding make and break device D. The closing of the make and break device D short circuits the spark-gap C, and this relieves the same of the duty of carrying the current load around the condenser B, thereby quickly quenching the arc and saving the terminals $c'$ and $c^2$ of the spark-gap from damage. The full impendance value of the reactance A being brought into operation, as above described, the flow of current will be curled or limited until the main circuit make and break devices Y, which serve the phases $a$, $b$, and $c$ of the feeder or power delivery circuit, are actuated to entirely switch off the current.

If desired a low resistance K may be inserted in each spark-gap shunt circuit to prevent the first rush of current over the spark-gap from being excessive, while at the same time also serving to quickly damp out any oscillation which may tend to arise.

In the operation of my novel current limiting system, the functioning of the spark-gap C is practically instantaneous upon sudden tendency to current rise in the power delivery circuit, and consequently the condenser B is at once cut out of the circuit to bring into effect the full impedance value of the reactance A, whereby the current is prevented from rising to a dangerous value.

I do not limit myself to the specific arrangement of my novel system as illustrated in the drawing and as above described in detail, the same merely representing one illustrative form thereof which embodies the principles upon which my invention is based, and it is deemed within the scope of my invention, as defined in the appended claims, to make various alterations in the arrangement of the system, as well as to substitute various equivalents for the specific devices of the combination. For example, I may prefer to short circuit the reactance A instead of the condenser B by the spark-gap C and parallel make and break device D, in which case the balancing effect of the reactance A would be removed on operation to leave the condenser B as the element remaining in circuit to limit the flow of current. Furthermore, I do not desire to be limited to the use of a spark-gap C only, since there may be substituted therefor any other form of rapidly acting electric valve adapted to quickly pass current when subjected to high voltage; I may even desire in some instances to omit the spark gap C or equivalent valve, and use a sensitive make and break device D alone arranged to operate automatically by aid of a suitable relay, or even to be manually operated.

Having thus described my invention, I claim:—

1. The combination with a power delivery circuit of a reactance element and a capacitance element connected in series in said circuit to provide a normal substantially neutralized impedance, and means excited by sudden current rises in said circuit operating to short circuit one of said elements to thereby bring into effect the full current limiting value of the other element remaining in circuit.

2. The combination with a power delivery circuit of a reactance element and a capacitance element connected in series in said circuit to provide a normal substantially neutralized impedance, and a rapidly acting electric valve in shunt across one element adapted to automatically by-pass current around said element when said current rises to a predetermined value, thus bringing into effect the full current limiting value of the other element remaining in circuit.

3. The combination with a power delivery circuit of a reactance element and a capacitance element connected in series in said circuit to provide a normal substantially neutralized impedance, a rapidly acting electric valve in shunt across one element adapted to automatically by-pass current around said element when said current rises to a predetermined value, thus bringing into effect the full current limiting value of the other element remaining in circuit, a high speed normally open make and break device in parallel with said electric valve, an auxiliary control circuit including a relay for actuating said make and break device, and a transformer excited by current by-passed through said valve to actuate said relay whereby said make and break device is closed to relieve said valve.

4. The combination with a power delivery circuit of a reactance and a condenser connected in series in said circuit whereby the capacity of the latter normally compensates the impedance of the former, and means excited by sudden current rises in said circuit operating to short circuit said condenser to thereby relieve said reactance for exercise of its full impedance value.

5. The combination with a power delivery circuit of a reactance and a condenser connected in series in said circuit whereby the capacity of the latter normally compensates the impedance of the former, and a spark-gap in shunt across said condenser adapted to automatically break over and by-pass current around said condenser when said current rises to a predetermined value, thus removing the neutralizing effect of the condenser capacity upon the impedance value of said reactance.

6. The combination with a power delivery circuit of a reactance and a condenser connected in series in said circuit whereby the capacity of the latter normally compensates the impedance of the former, a spark-gap in shunt across said condenser adapted to automatically break over and by-pass current around said condenser when said current rises to a predetermined value, thus removing the neutralizing effect of the condenser capacity upon the impedance value of said reactance, a high speed normally open make and break device in parallel with said spark-gap, an auxiliary control circuit including a relay for actuating said make and break device, and a transformer excited by current by-passed through said spark-gap to actuate said relay whereby said make and break is closed to quench said spark-gap.

In testimony, that I claim the invention set forth above I have hereunto set my hand this 17th day of April, 1926.

FRAZER W. GAY.